(12) United States Patent
Johnson et al.

(10) Patent No.: US 8,496,206 B2
(45) Date of Patent: Jul. 30, 2013

(54) STRUCTURAL PANELS FOR USE IN AIRCRAFT FUSELAGES AND OTHER STRUCTURES

(75) Inventors: Kent E. Johnson, Seattle, WA (US); Mark A. Ulvin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 12/762,129

(22) Filed: Apr. 16, 2010

(65) Prior Publication Data

US 2010/0223772 A1    Sep. 9, 2010

Related U.S. Application Data

(62) Division of application No. 11/522,184, filed on Sep. 14, 2006, now Pat. No. 7,716,835.

(51) Int. Cl.
 *B64C 1/00* (2006.01)
(52) U.S. Cl.
 USPC .......... 244/119; 244/123.1; 244/133; 29/897; 29/897.2; 156/245; 156/285; 156/297; 428/102; 428/119
(58) Field of Classification Search
 USPC .. 29/897, 897.2; 156/245, 285, 297; 244/119, 244/123.1, 133; 428/102, 119, 122
 See application file for complete search history.

(56) References Cited

U.S. PATENT DOCUMENTS

| | | | |
|---|---|---|---|
| 2,004 A | 3/1841 | Huner et al. | |
| 1,976,257 A | 10/1934 | Harper, Jr. | |
| 2,292,372 A | 8/1942 | Glendon et al. | |
| 2,367,750 A | 1/1945 | Berkow et al. | |
| 2,387,219 A | 10/1945 | Barnes | |
| 2,992,711 A | 7/1961 | Mitchell et al. | |
| 3,071,217 A | 1/1963 | Gould | |
| 3,306,797 A | 2/1967 | Boggs | |
| 3,452,501 A | 7/1969 | Zimmer et al. | |
| 3,490,983 A | 1/1970 | Lee | |

(Continued)

FOREIGN PATENT DOCUMENTS

| | | |
|---|---|---|
| DE | 3040838 | 5/1982 |
| DE | 3331494 | 3/1985 |

(Continued)

OTHER PUBLICATIONS

PCT Search Report dated Nov. 30, 2005 regarding international application No. PCT/US2005/010336, 3 pages.

(Continued)

*Primary Examiner* — Richard Chang
(74) *Attorney, Agent, or Firm* — Yee & Associates, P.C.

(57) ABSTRACT

Structural panels for use in manufacturing aircraft fuselages and other structures are disclosed herein. In one embodiment, a structural panel configured in accordance with the invention includes a skin and at least first and second stiffeners. The first stiffener can have a first flange portion mated to the skin and a first raised portion projecting away from the skin. The second stiffener can have a second flange portion mated to the skin and a second raised portion projecting away from the skin. At least one of the first flange portion of the first stiffener and the second flange portion of the second stiffener can extend toward the other of the first flange portion and the second flange portion to form an at least approximately continuous support surface to which a frame can be attached.

21 Claims, 6 Drawing Sheets

U.S. PATENT DOCUMENTS

| | | | |
|---|---|---|---|
| 3,507,634 A | 4/1970 | O'Driscoll | |
| 3,603,096 A | 9/1971 | Wells | |
| 3,879,245 A | 4/1975 | Fetherston et al. | |
| 3,976,269 A | 8/1976 | Gupta | |
| 3,995,080 A | 11/1976 | Cogburn et al. | |
| 4,064,534 A | 12/1977 | Chen et al. | |
| 4,086,378 A | 4/1978 | Kam et al. | |
| 4,186,535 A | 2/1980 | Morton | |
| 4,256,790 A | 3/1981 | Lackman et al. | |
| 4,310,132 A | 1/1982 | Frosch et al. | |
| 4,448,838 A | 5/1984 | McClenahan et al. | |
| 4,463,044 A | 7/1984 | McKinney | |
| 4,490,958 A | 1/1985 | Lowe | |
| 4,548,017 A | 10/1985 | Blando | |
| 4,548,859 A | 10/1985 | Kline et al. | |
| 4,608,220 A | 8/1986 | Caldwell et al. | |
| 4,631,221 A | 12/1986 | Disselbeck et al. | |
| 4,693,678 A | 9/1987 | Von Volkli | |
| 4,699,683 A | 10/1987 | McCowin | |
| 4,715,560 A | 12/1987 | Loyek | |
| 4,736,566 A | 4/1988 | Krotsch | |
| 4,760,444 A | 7/1988 | Nielson et al. | |
| 4,780,262 A | 10/1988 | VonVolkli | |
| 4,790,898 A | 12/1988 | Woods | |
| 4,828,202 A | 5/1989 | Jacobs et al. | |
| 4,830,298 A | 5/1989 | Van Blunk | |
| 4,877,471 A | 10/1989 | McCowin et al. | |
| 4,941,182 A | 7/1990 | Patel | |
| 5,024,399 A | 6/1991 | Barquet et al. | |
| 5,058,497 A | 10/1991 | Bishop et al. | |
| 5,086,997 A | 2/1992 | Glass | |
| 5,223,067 A | 6/1993 | Hamamoto et al. | |
| 5,242,523 A * | 9/1993 | Willden et al. | 156/285 |
| 5,251,849 A | 10/1993 | Torres | |
| 5,262,220 A | 11/1993 | Spriggs et al. | |
| 5,297,760 A | 3/1994 | Hart-Smith | |
| 5,337,647 A | 8/1994 | Roberts et al. | |
| 5,399,406 A | 3/1995 | Matsuo et al. | |
| 5,429,326 A | 7/1995 | Garesche et al. | |
| 5,439,549 A | 8/1995 | Frye et al. | |
| 5,450,147 A | 9/1995 | Dorsey-Palmateer | |
| 5,518,208 A | 5/1996 | Roseburg | |
| 5,540,126 A | 7/1996 | Piramoon | |
| 5,562,788 A | 10/1996 | Kitson et al. | |
| 5,619,837 A | 4/1997 | DiSanto | |
| 5,622,733 A | 4/1997 | Asher | |
| 5,651,600 A | 7/1997 | Dorsey-Palmateer | |
| 5,683,646 A | 11/1997 | Reiling, Jr. | |
| 5,700,337 A | 12/1997 | Jacobs et al. | |
| 5,746,553 A | 5/1998 | Engwall | |
| 5,765,329 A | 6/1998 | Huang | |
| 5,804,276 A | 9/1998 | Jacobs et al. | |
| 5,814,386 A | 9/1998 | Vasiliev et al. | |
| 5,871,117 A | 2/1999 | Protasov et al. | |
| 5,893,534 A | 4/1999 | Watanabe | |
| 5,951,800 A | 9/1999 | Pettit | |
| 5,954,917 A | 9/1999 | Jackson et al. | |
| 5,963,660 A | 10/1999 | Koontz et al. | |
| 5,979,531 A | 11/1999 | Barr et al. | |
| 6,003,812 A | 12/1999 | Micale et al. | |
| 6,012,883 A | 1/2000 | Engwall et al. | |
| 6,013,341 A | 1/2000 | Medvedev et al. | |
| 6,045,651 A | 4/2000 | Kline et al. | |
| 6,074,716 A | 6/2000 | Tsotsis | |
| 6,086,696 A | 7/2000 | Gallagher | |
| 6,112,792 A | 9/2000 | Barr et al. | |
| 6,114,012 A | 9/2000 | Amaoka et al. | |
| 6,114,050 A | 9/2000 | Westre et al. | |
| 6,155,450 A | 12/2000 | Vasiliev et al. | |
| 6,168,358 B1 | 1/2001 | Engwall et al. | |
| 6,187,411 B1 | 2/2001 | Palmer | |
| 6,190,484 B1 | 2/2001 | Appa | |
| 6,205,239 B1 | 3/2001 | Lin et al. | |
| 6,364,250 B1 | 4/2002 | Brinck et al. | |
| 6,374,750 B1 | 4/2002 | Early | |
| 6,390,169 B1 | 5/2002 | Johnson | |
| 6,415,581 B1 | 7/2002 | Shipman et al. | |
| 6,451,152 B1 | 9/2002 | Holmes et al. | |
| 6,480,271 B1 | 11/2002 | Cloud et al. | |
| 6,508,909 B1 | 1/2003 | Cerezo Pancorbo et al. | |
| 6,510,961 B1 | 1/2003 | Head et al. | |
| 6,511,570 B2 | 1/2003 | Matsui | |
| 6,613,258 B1 | 9/2003 | Maison et al. | |
| 6,648,273 B2 * | 11/2003 | Anast | 244/119 |
| 6,692,681 B1 | 2/2004 | Lunde | |
| 6,702,911 B2 | 3/2004 | Toi et al. | |
| 6,730,184 B2 | 5/2004 | Kondo et al. | |
| 6,766,984 B1 * | 7/2004 | Ochoa | 244/119 |
| 6,779,707 B2 | 8/2004 | Dracup et al. | |
| 6,786,452 B2 | 9/2004 | Yamashita et al. | |
| 6,799,619 B2 | 10/2004 | Holmes et al. | |
| 6,802,931 B2 | 10/2004 | Fujihira | |
| 6,814,822 B2 | 11/2004 | Holmes et al. | |
| 6,817,574 B2 | 11/2004 | Solanille et al. | |
| 6,860,957 B2 | 3/2005 | Sana et al. | |
| 6,871,684 B2 | 3/2005 | Engelbart et al. | |
| 6,910,043 B2 | 6/2005 | Iivonen et al. | |
| 7,025,305 B2 | 4/2006 | Folkesson et al. | |
| 7,039,485 B2 | 5/2006 | Engelbart et al. | |
| 7,048,024 B2 | 5/2006 | Clark et al. | |
| 7,074,474 B2 | 7/2006 | Toi et al. | |
| 7,080,441 B2 | 7/2006 | Braun | |
| 7,080,805 B2 | 7/2006 | Prichard et al. | |
| 7,083,698 B2 | 8/2006 | Engwall et al. | |
| 7,093,797 B2 | 8/2006 | Grether et al. | |
| 7,134,629 B2 | 11/2006 | Johnson et al. | |
| 7,137,182 B2 | 11/2006 | Nelson | |
| 7,159,822 B2 | 1/2007 | Grantham et al. | |
| 7,171,033 B2 | 1/2007 | Engelbart et al. | |
| 7,193,696 B2 | 3/2007 | Engelbart et al. | |
| 7,195,201 B2 | 3/2007 | Grether et al. | |
| 7,228,611 B2 | 6/2007 | Anderson et al. | |
| 7,236,625 B2 | 6/2007 | Engelbart et al. | |
| 7,278,198 B2 | 10/2007 | Olson et al. | |
| 7,282,107 B2 | 10/2007 | Johnson et al. | |
| 7,289,656 B2 | 10/2007 | Engelbart et al. | |
| 7,325,771 B2 | 2/2008 | Stulc et al. | |
| 7,503,368 B2 | 3/2009 | Chapman et al. | |
| 7,527,222 B2 | 5/2009 | Biornstad et al. | |
| 7,624,488 B2 | 12/2009 | Lum et al. | |
| 7,716,835 B2 | 5/2010 | Johnson et al. | |
| 8,157,212 B2 | 4/2012 | Biornstad et al. | |
| 8,168,023 B2 | 5/2012 | Chapman et al. | |
| 8,182,628 B2 | 5/2012 | Biornstad et al. | |
| 2005/0263645 A1 | 12/2005 | Johnson et al. | |
| 2006/0118244 A1 | 6/2006 | Zaballos et al. | |

FOREIGN PATENT DOCUMENTS

| | | |
|---|---|---|
| EP | 0198744 | 10/1986 |
| EP | 0319797 | 6/1989 |
| EP | 0833146 | 4/1998 |
| EP | 1149687 | 10/2001 |
| WO | WO03035380 | 5/2003 |
| WO | WO2005057497 | 6/2005 |
| WO | WO2006001859 | 1/2006 |

OTHER PUBLICATIONS

PCT Search Report dated May 25, 2005 regarding international application No. PCT/US2004/039905, 1 pages.

"Bristish Aerospace Aircraft: BAe 146", Flight International, May 1981, 2 pages.

"A Barrelful of Experience", Interavia, May 1992, p. 36.

"Beechcraft's Composite Challenge", aerotalk.com, accessed Mar. 1, 2004, 2 pages.

"CNC fiber placement used to create an all-composite fuselage", Aerospace Engineering Online, Top 15 Technologies, SAE International, Oct. 2005, 2 pages http://web.archive.org/web/20001005030853/http://www.sae.org/aeromag/techinnovations/1298t08.htm.

Evans, "Fiber Placement", ASM Handbook vol. 21: Composites, ASM International, 2001, pp. 477-479.

Fielder et al., "TANGO Composite Fuselage Platform", SAMPE Journal, vol. 39, No. 1, Jan./Feb. 2003, pp. 57-63.

Grimshaw et al., "Advanced Technology Tape Laying for Affordable Manufacturing of Large Composite Structures", Proceedings of the 46th International SAMPE Symposium and Exhibition, May 2001, 11 pages.

Grimshaw, "Automated Tape Laying", ASM Handbook vol. 21: Composites, ASM International, 2001, pp. 480-485.

"Premier I Features Lighter, Strong All-Composite Fuselage", WolfTracks vol. 4, No. 1, 1998, 3 pages.

"Raytheon Aircraft Orders Four More Fiber Cincinnati Fiber Placement Systems for Industry's First Composite-Fuselage Business Jets", Cincinnati Machine News Releases, Jul. 2000, 2 pages.

"Raytheon Aircraft's Hawker Horizon Reaches Fuselage Milestone", Beechcraft/Raytheon News Release, Oct. 2000, 2 pages.

"Raytheon's New Quiet Jets", Vibro-Acoustic Sciences Newsletter, Mar. 2000 vol. 4, No. 2, 2 pages.

"Filament Winding", Rocky Mountain Composites, accessed Apr. 1, 2004, 1 page.

Scott, "Toyota-made Plane Makes Flight Debut", Business Aviation, Jun. 2002, 1 page.

Sharp et al., "Material Selection/Fabrication Issues for Thermoplastic Fiber Placement", Journal of Thermoplastic Composite Materials, vol. 8, Jan. 1995, 13 pages.

Zhang, "Sensors in robotics", Lecture: Applied Sensor Technology, University of Hamburg, Nov. 2003, 40 pages.

USPTO Office Action dated Feb. 13, 2006 regarding U.S. Appl. No. 10/853,075, 18 pages.

Response to Office Action dated May 12, 2006 regarding U.S. Appl. No. 10/853,075, 11 pages.

USPTO Notice of Allowance dated Jun. 15, 2006 regarding U.S. Appl. No. 10/853,075, 6 pages.

USPTO Notice of Allowance dated Jan. 29, 2007 regarding U.S. Appl. No. 10/853,075, 3 pages.

Preliminary Amendment dated Sep. 14, 2006 regarding U.S. Appl. No. 11/522,184, 9 pages.

USPTO Requirement for Restriction dated Apr. 1, 2009 regarding U.S. Appl. No. 11/522,184, 6 pages.

Response to Restriction Requirement dated May 1, 2009 regarding U.S. Appl. No. 11/522,184, 8 pages.

USPTO Requirement for Restriction dated Sep. 3, 2009 regarding U.S. Appl. No. 11/522,184, 6 pages.

Response to Restriction Requirement dated Sep. 16, 2009 regarding U.S. Appl. No. 11/522,184, 8 pages.

USPTO Office Action dated Oct. 1, 2009 regarding U.S. Appl. No. 11/522,184, 17 pages.

USPTO Notice of Allowance dated Jan. 4, 2010 regarding U.S. Appl. No. 11/522,184, 8 pages.

Amendment after Allowance dated Mar. 26, 2010 regarding U.S. Appl. No. 11/522,184, 6 pages.

* cited by examiner

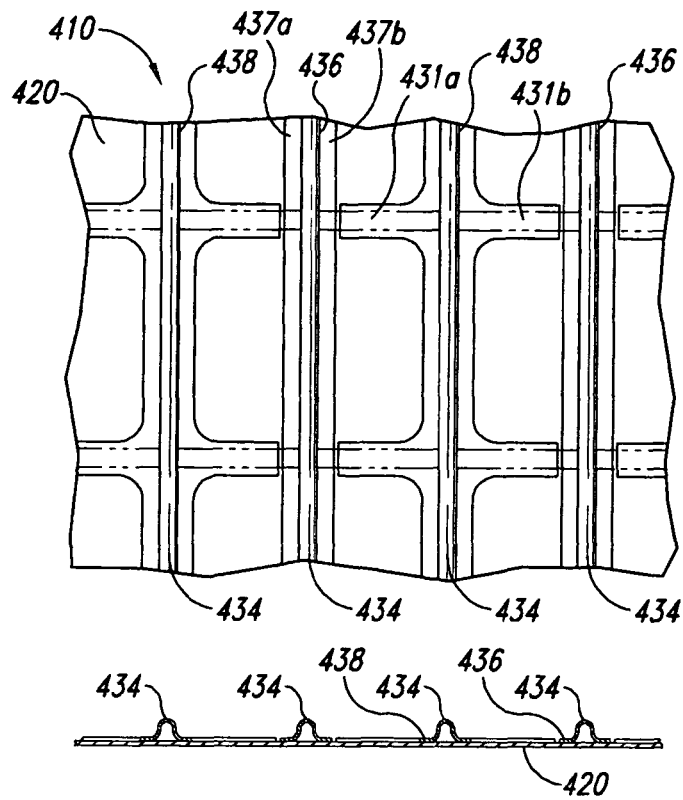
Fig. 4A
Fig. 4B
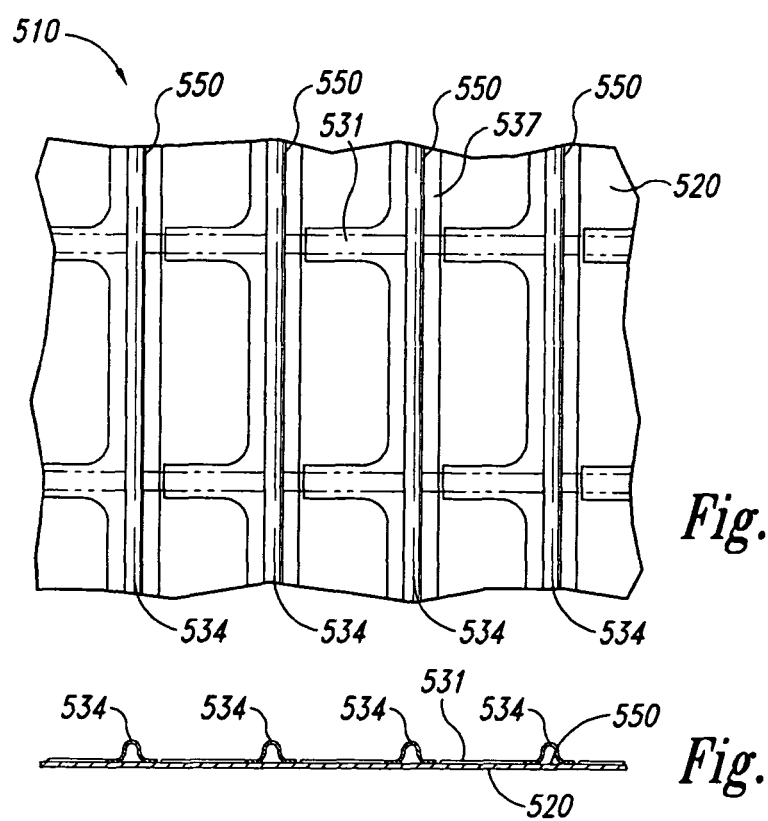
Fig. 5A
Fig. 5B

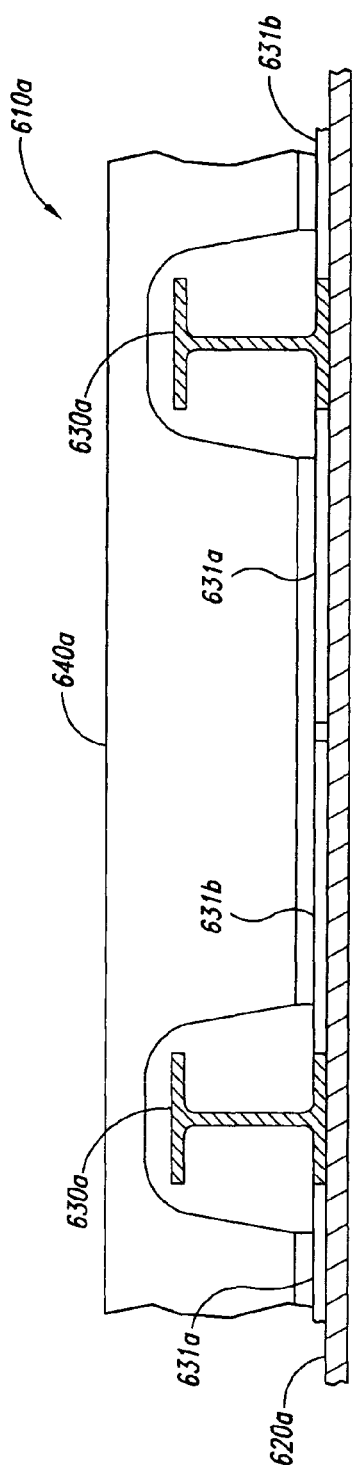
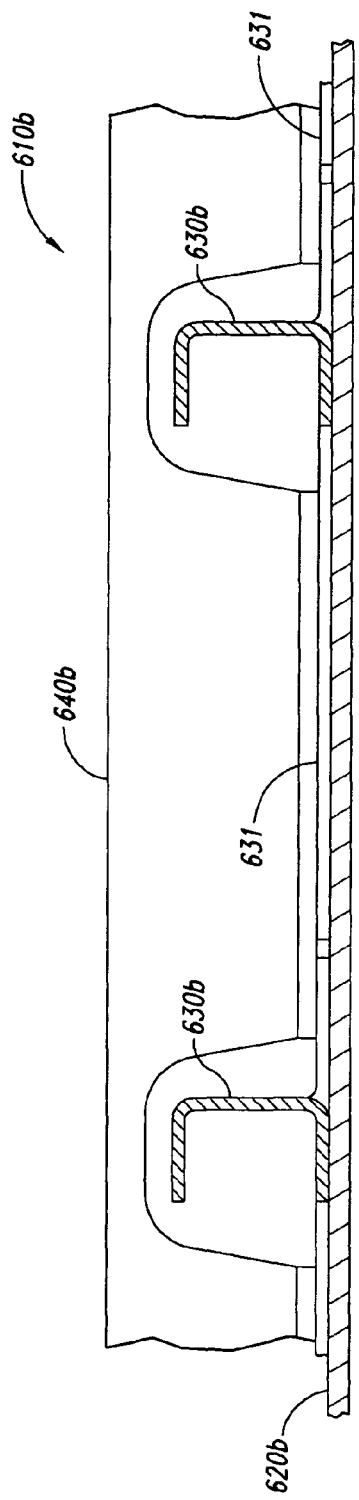

STRUCTURAL PANELS FOR USE IN AIRCRAFT FUSELAGES AND OTHER STRUCTURES

CROSS-REFERENCE TO RELATED APPLICATION:

The present application claims priority to U.S. Provisional Patent Application No. 60/559,991, entitled "STRUCTURAL PANELS FOR USE IN AIRCRAFT FUSELAGES AND OTHER STRUCTURES," filed Apr. 6, 2004, and incorporated herein in its entirety by reference. This application is a divisional of application Ser. No. 11/522,184, filed Sep. 14, 2006, status allowed.

TECHNICAL FIELD

The following disclosure relates generally to structural panels and, more particularly, to structural panels for use in aircraft fuselages and other structures.

BACKGROUND

Aircraft manufacturers continually strive for ways to increase aircraft performance and reduce manufacturing costs. One well-known method for increasing aircraft performance is to reduce airframe weight through the use of state-of-the-art materials, such as composites, having relatively high strength-to-weight ratios. Conventional methods for manufacturing airframes with composite materials, however, often require relatively expensive tooling and labor-intensive assembly procedures.

FIG. 1 is an isometric view of a metal aircraft panel 100 configured in accordance with the prior art. The panel 100 includes a frame 106 and a plurality of stringers 104 attached to a skin 102 in a "semi-monocoque" configuration. The stringers 104 are "hat-section" stringers having a raised portion 103 and opposing flange portions 105. The flange portions 105 are attached directly to the skin 102.

The frame 106 includes a first frame section 107 and a second frame section 108. The first frame section 107 includes a base portion 109 and an upstanding leg portion 110. The upstanding leg portion 110 is fastened to the second frame section 108, and includes a plurality of openings or "mouse holes" 114 through which the raised portions 103 of the stringers 104 extend. The base portion 109 is attached to the stringer flange portions 105 and the skin 102. The base portion 109 includes a plurality of steps or "joggles" 112 positioned just outboard of the stringer flange portions 105. The joggles 112 allow the base portion 109 to step off of the stringer flange portions 105 and onto the skin 102. This allows the base portion 109 to be fastened directly to the skin 102 between the stringers 104 without causing gaps or excessive preload between the base portion 109 and the skin 102.

One shortcoming of the prior art panel 100 is that it can be expensive to manufacture. Forming the joggles 112 in the first frame section 107, for example, adds additional cost when compared to a similar frame section without joggles. This is especially true if the first frame section 107 is manufactured from composite materials rather than metal, because forming joggles in composite materials typically requires special tooling and/or post-cure machining.

SUMMARY

The present invention is directed generally toward structural panels for use in manufacturing aircraft and other structures. A structural panel configured in accordance with one aspect of the invention includes a skin and at least first and second stiffeners. The first stiffener can have a first flange portion mated to the skin and a first raised portion projecting away from the skin. The second stiffener can be spaced apart from the first stiffener and can have a second flange portion mated to the skin and a second raised portion projecting away from the skin. The structural panel can further include a frame section having a base portion mated to the first flange portion of the first stiffener and the second flange portion of the second stiffener without being mated to the skin between the first raised portion of the first stiffener and the second raised portion of the second stiffener. In another aspect of the invention, at least one of the first flange portion of the first stiffener and the second flange portion of the second stiffener can extend toward the other to form an at least approximately continuous support surface extending between the first raised portion of the first stiffener and the second raised portion of the second stiffener.

An aircraft fuselage configured in accordance with another aspect of the invention includes a passenger cabin and a plurality of structural panels operably coupled together to form a portion of the passenger cabin. Individual structural panels can include a skin and at least first and second stiffeners. The first stiffener can have a first flange portion mated to the skin and a first raised portion projecting away from the skin. The second stiffener can be spaced apart from the first stiffener and can similarly include a second flange portion mated to the skin and a second raised portion projecting away from the skin. Individual structural panels can further include a frame section having a base portion mated to the first flange portion of the first stiffener and the second flange portion of the second stiffener without being mated to the skin between the first raised portion of the first stiffener and the second raised portion of the second stiffener.

A method for manufacturing a structural panel in accordance with a further aspect of the invention includes mating at least a first flange portion of a first stiffener to a skin, and mating at least a second flange portion of a second stiffener to the skin. The first stiffener can include a first raised portion projecting away from the skin, and the second stiffener can include a second raised portion projecting away from the skin. The method can further include mating a base portion of a frame to the first flange portion of the first stiffener and the second flange portion of the second stiffener without mating the base portion to the skin between the first raised portion of the first stiffener and the second raised portion of the second stiffener.

BRIEF DESCRIPTION OF THE DRAWINGS

FIGS. 4A and 4B are top and end views, respectively, of a portion of a structural panel configured in accordance with another embodiment of the invention.

FIGS. 5A and 5B are top and end views, respectively, of a portion of a structural panel configured in accordance with a further embodiment of the invention.

FIGS. 6A and 6B are cross-sectional end views of portions of structural panels configured in accordance with other embodiments of the invention.

DETAILED DESCRIPTION

The following disclosure describes structural panels for use in manufacturing aircraft and other structures. Certain details are set forth in the following description and in FIGS. 2-6B to provide a thorough understanding of various embodiments of the invention. Other details describing well-known structures and systems often associated with aircraft structures and composite materials are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 210 is first introduced and discussed with reference to FIG. 2.

Figure 1:
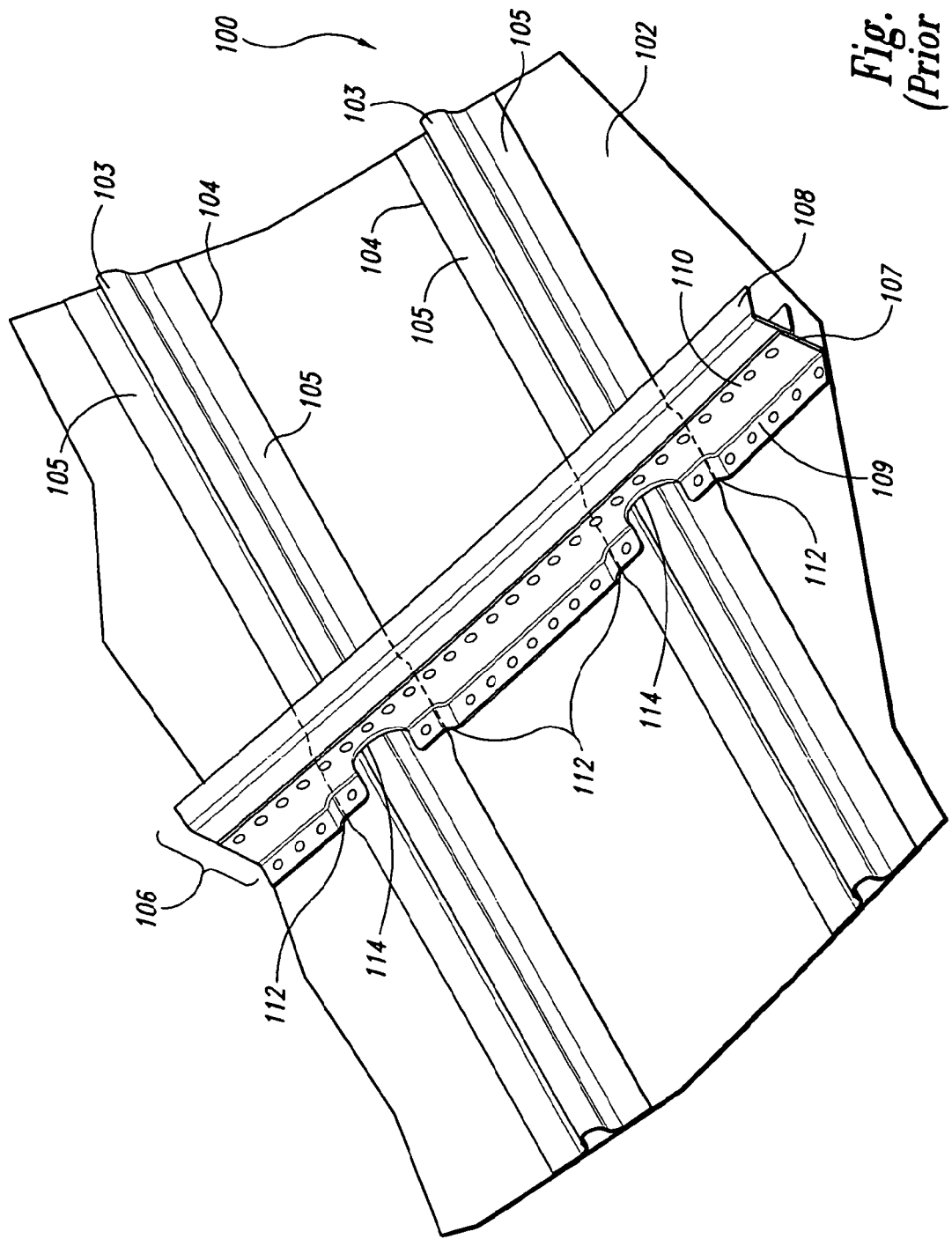
FIG. 1 is an isometric view of a metal aircraft panel configured in accordance with the prior art.
Figure 2:
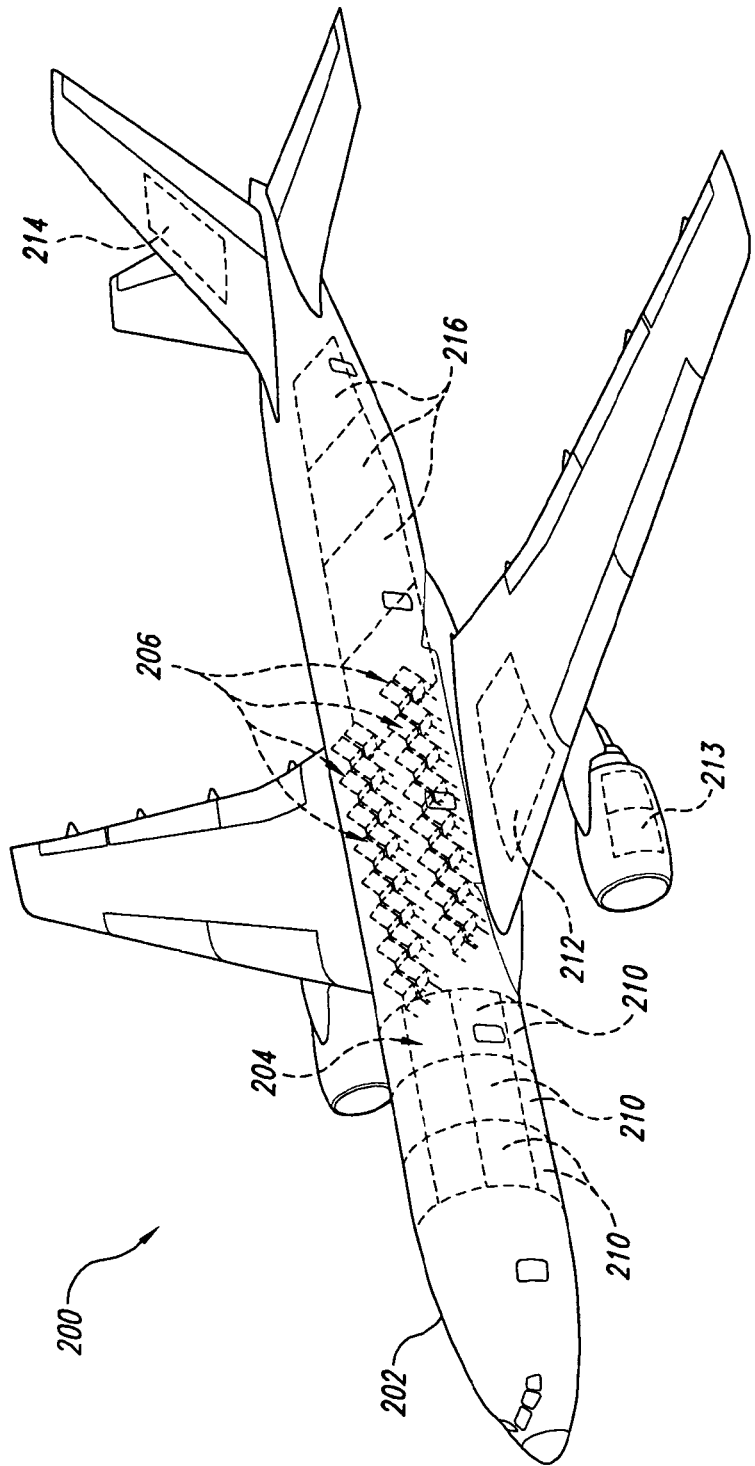
FIG. 2 is a partially hidden isometric view of an aircraft having a fuselage that includes a plurality of structural panels configured in accordance with an embodiment of the invention.

FIG. 2 is a partially hidden isometric view of an aircraft 200 having a fuselage 202 that includes a plurality of structural panels 210 configured in accordance with an embodiment of the invention. In one aspect of this embodiment, the structural panels 210 are operably coupled together to form an exterior portion of the fuselage 202 adjacent to a passenger cabin 204. The passenger cabin 204 can be configured to hold a plurality of passenger seats 206 ranging in number from about 50 to about 700 seats, e.g., from about 150 to about 600 seats. In another aspect of this embodiment described in greater detail below, the structural panels 210 can include one or more composite materials. In other embodiments, the structural panels 210 can be composed largely of metallic materials such as aluminum, titanium, and/or steel.

In a further aspect of this embodiment, the aircraft 200 can also include one or more wing panels 212, nacelle panels 213, and/or stabilizer panels 214. Each of the foregoing panels 212-214 can be at least generally similar in structure and function to the structural panel 210. Accordingly, the structural panels 210 or variations thereof may be used for portions of the aircraft 200 other than the fuselage 202. Further, use of such panels is not limited to exterior portions of the aircraft 200, but can extend to interior structural and/or nonstructural portions. For example, in one embodiment, the aircraft 200 can further include a plurality of floor panels 216 forming a floor portion of the passenger cabin 204. The floor panels 216 can be at least generally similar in structure and function to the structural panels 210.

Figure 3A:
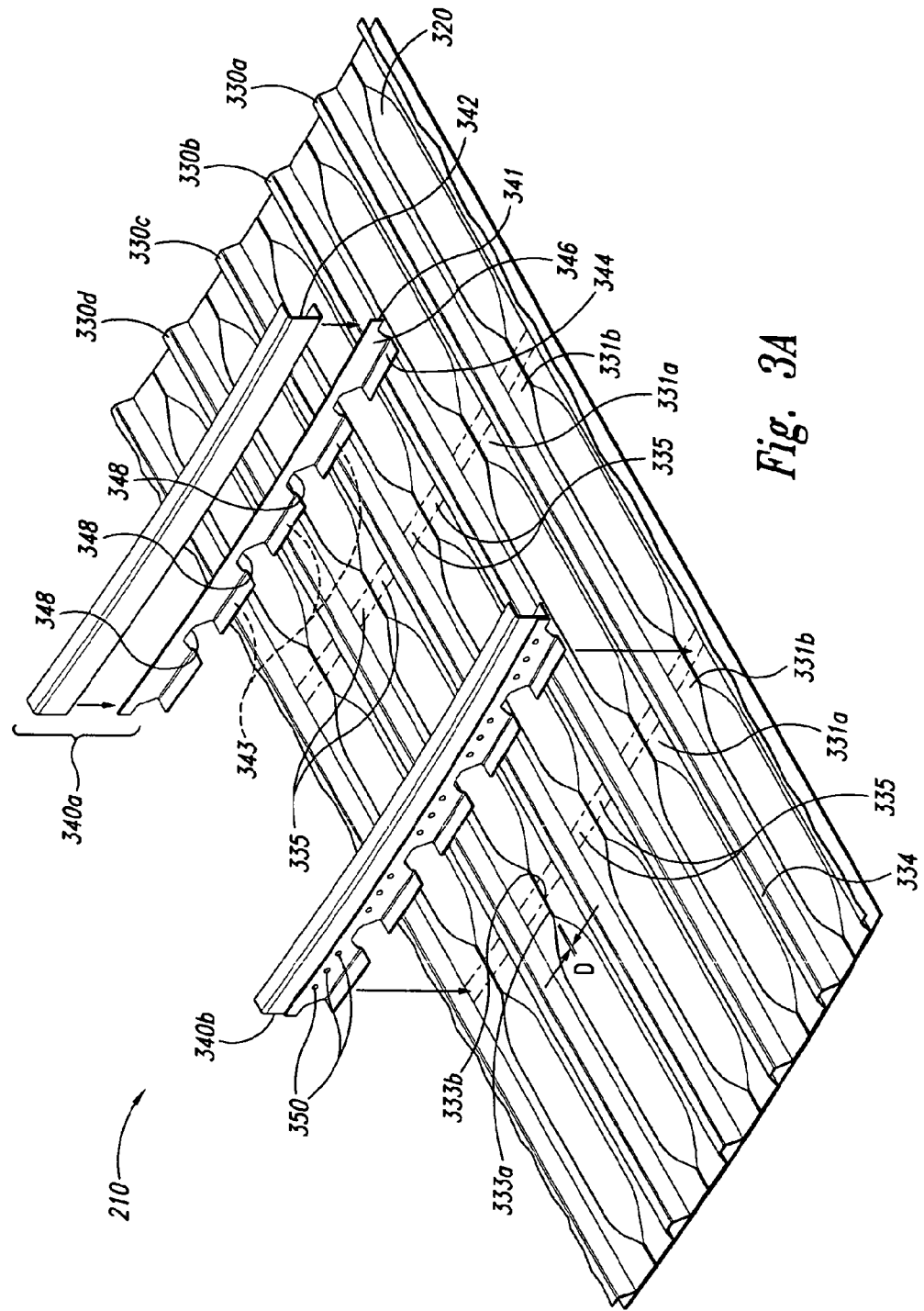
FIGS. 3A and 3B are a partially exploded isometric view and an assembled isometric view, respectively, of a structural panel configured in accordance with an embodiment of the invention.
Figure 3B:
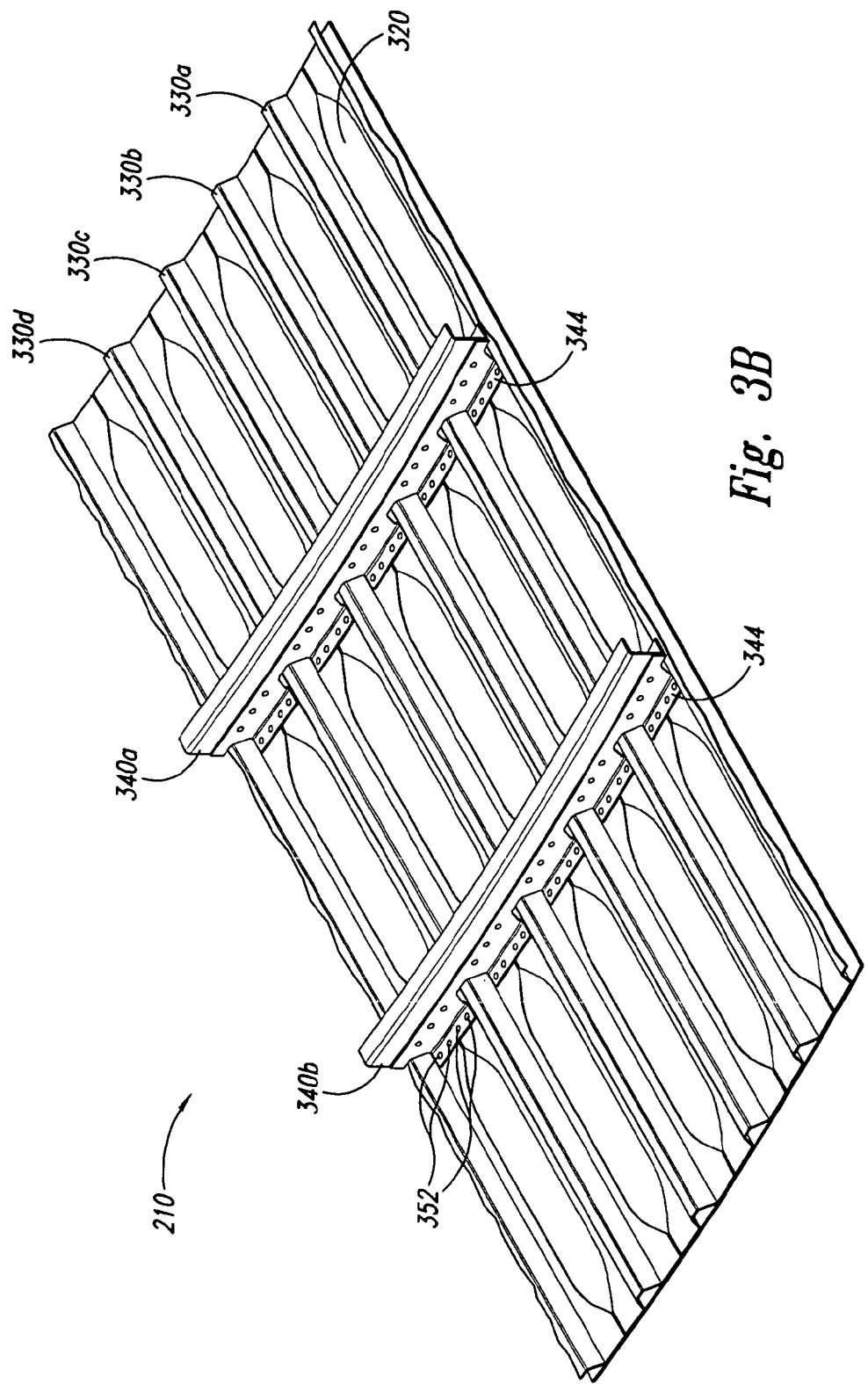

FIGS. 3A and 3B are a partially exploded isometric view and an assembled isometric view, respectively, of the structural panel 210 configured in accordance with an embodiment of the invention. The structural panel 210 is illustrated as a flat panel in FIGS. 3A and 3B for ease of illustration. However, in many embodiments, the structural panel 210 is curved to form part of a cylindrical surface, such as an exterior surface of a fuselage. Referring to FIGS. 3A and 3B together, the structural panel 210 can include a plurality of stiffeners 330 (identified individually as stiffeners 330a-d) attached to a skin 320. Each of the stiffeners 330 can include a raised portion 334 projecting away from the skin 320 and a plurality of flange portions 331 (identified as a plurality of first flange portions 331a extending outwardly from one side of the stiffener 330, and a plurality of second flange portions 331b extending outwardly from the opposite side of the stiffener 330). The flange portions 331 can be mated directly to the skin 320. In the illustrated embodiment, the stiffeners 330 have hat-shaped cross-sections. In other embodiments described below, however, the stiffeners 330 can have other cross-sectional shapes.

The skin 320 and the stiffeners 330 can include composite materials, such as graphite-epoxy materials, and the stiffeners 330 can be adhesively bonded to the skin 320. For example, in one embodiment, the stiffeners 330 can be bonded to the skin 320 during a co-curing process in which the stiffeners 330 and the skin 320 are co-cured at an elevated temperature and pressure. In another embodiment, the stiffeners 330 and the skin 320 can include metallic materials. In this embodiment, the stiffeners 330 can be riveted or otherwise mechanically fastened to the skin 320.

Each of the stiffeners 330 can be positioned on the skin 320 so that the plurality of first flange portions 331a of one stiffener 330 are aligned with the corresponding plurality of second flange portions 331b of an adjacent stiffener 330. For example, each of the first flange portions 331a can include a first outer edge 333a, and each of the second flange portions 331b can include a corresponding second outer edge 333b. In one embodiment, the first outer edge 333a can be spaced apart from the second outer edge 333b by a distance D of about 0.5 inch or less. In another embodiment, the distance D can be about 0.2 inch or less, e.g., about 0.1 inch or less. In yet another embodiment, the stiffeners 330 can be positioned on the skin 320 such that the first flange portions 331a at least approximately contact the second flange portions 331b in which case the distance D is at least approximately zero. By aligning the flange portions 331 in the foregoing manner, the flange portions 331 can form a plurality of at least approximately continuous support surfaces 335 extending between the raised portions 334 of the stiffeners 330.

The structural panel 210 can further include a plurality of support members or frames 340 (identified individually as a first frame 340a and a second frame 340b). In the illustrated embodiment, the frames 340 are two-piece frames that include a first frame section 341 and a second frame section 342. In other embodiments, the structural panel 210 can include other frames composed of more or fewer frame sections.

The first frame section 341 includes a base portion 344 and an upstanding portion 346 projecting away from the base portion 344. The upstanding portion 346 can include a plurality of openings or "mouse holes" 348 through which the raised portions 334 of the stiffeners 330 extend. The base portion 344 can include a plurality of mating surfaces 343 extending between the mouse holes 348. The mating surfaces 343 are configured to contact corresponding ones of the support surfaces 335 extending between the raised portions 334 of the stiffeners 330. The mating surfaces 343 of the illustrated embodiment are absent any joggles between the mouse holes 348 because the corresponding support surfaces 335 to which they mate are at least approximately continuous between the stiffeners 330 and do not include any significant surface steps or misalignments. An advantage of this feature is that it avoids the added costs associated with manufacturing frames with joggles. Such costs may be particularly significant when working with composite materials because, unlike metals that are malleable and can be easily formed, creating joggles or steps in composite surfaces typically requires special tooling and/or post-cure machining.

In one embodiment of the invention, the first frame section 341 can be attached to the structural panel 210 first, and then the second frame section 342 can be attached to the first frame section 341. When attaching the first frame section 341 to the structural panel 210, the base portion 344 of the first frame section 341 is mated to the flange portions 331 of the stiffeners 330 without being mated to the skin 320. That is, the mating surfaces 343 of the base portion 344 contact the support surfaces 335 but not the skin 320. In this manner, the flange portions 331 are effectively sandwiched between the first frame section 341 and the skin 320. In one embodiment, the first frame section 341 can be fastened to the structural panel 210 with a series of suitable fasteners 352. In another embodiment, the base portion 344 can be adhesively bonded directly to the flange portions 331.

After the first frame section 341 has been attached to the structural panel 210, the second frame section 342 can be attached to the upstanding portion 346 of the first frame section 341. In one embodiment, the second frame section 342 can be fastened to the upstanding portion 346 with a series of suitable fasteners 350. In another embodiment, the second frame section 342 can be adhesively bonded to the upstanding portion 346. One advantage of attaching the second frame section 342 to the first frame section 341 after the first frame section 341 has been attached to the structural panel 210 is that the final position of the second frame section 342 can be adjusted to compensate for any misalignment of the first frame section 341 that occurs during attachment. In other embodiments, however, the first frame section 341 can be attached to the second frame section 342 first, and then the frame 340 can be attached to the structural panel 210 as a unit. One advantage of attaching the frame 340 as a unit is that it may be faster than attaching the frame 340 in two stages.

A first stiffener 330a may further comprise a third flange portion and a second stiffener 330b may further comprise a fourth flange portion. The third flange portion and the fourth flange portion may be bonded to skin 320. The third flange portion and the fourth flange portion may be separated from each other at a distance greater than distance D between first flange portion 331a and second flange portion 331b.

In the illustrated embodiment, the second frame section 342 has a C-shaped cross-section. In other embodiments, the second frame section 342 can have other cross-sectional shapes, such as an L-shaped cross-section. In yet other embodiments, the second frame section 342 can be omitted.

FIGS. 4A and 4B are top and end views, respectively, of a portion of a structural panel 410 configured in accordance with another embodiment of the invention. Referring to FIGS. 4A and 4B together, the structural panel 410 can include a plurality of first stiffeners 436 and a plurality of second stiffeners 438 attached to a skin 420. Each of the stiffeners 436 and 438 can include a raised portion 434 projecting away from the skin 420. Each of the first stiffeners 436 can further include a first flange portion 437a and an opposing second flange portion 437b that are both at least generally straight. Each of the second stiffeners 438, however, can further include a plurality of first flange portions 431a and a plurality of second flange portions 431b that extend outwardly from the raised portion 434 to at least proximate corresponding flange portions 437 of the adjacent first stiffeners 436. A frame (not shown) can mate to the flange portions 431 and 437 as described above with reference to FIGS. 3A and 3B.

FIGS. 5A and 5B are top and end views, respectively, of a portion of a structural panel 510 configured in accordance with a further embodiment of the invention. Referring to FIGS. 5A and 5B together, in one aspect of this embodiment, the structural panel 510 includes a plurality of asymmetric stiffeners 550 attached to a skin 520. Each of the asymmetric stiffeners 550 can include a plurality of first flange portions 531 extending outwardly from one side of a raised portion 534, and a second flange portion 537 extending outwardly from the opposite side of the raised portion 534. The second flange portion 537 can be at least approximately straight. The first flange portions 531, however, can project outwardly from the raised portion 534 to at least proximate the corresponding second flange portion 537 of the adjacent stiffener 550. A frame (not shown) can mate to the flange portions 531 and 537 as described above with reference to FIGS. 3A and 3B.

FIGS. 6A and 6B are cross-sectional end views of portions of structural panels 610a and 610b, respectively, configured in accordance with further embodiments of the invention. Referring first to FIG. 6A, the structural panel 610a can include a plurality of I-section stiffeners 630a attached to a skin 620a. Each of the I-section stiffeners 630a can include a plurality of first flange portions 631a and a plurality of second flange portions 631b that are at least generally similar in structure and function to the corresponding flange portions 331 described above with reference to FIGS. 3A and 3B. In another aspect of this embodiment, a frame 640a can mate to the flange portions 631 as described above with reference to FIGS. 3A and 3B.

Referring next to FIG. 6B, the structural panel 610b can include a plurality of C-section stiffeners 630b attached to a skin 620b. The C-section stiffeners 630b can include flange portions 631 that are at least generally similar in structure and function to the first flange portions 531 described above with reference to FIGS. 5A and 5B. In another aspect of this embodiment, a frame 640b can mate to the flange portions 631 as described above with reference to FIGS. 3A and 3B.

Various components described herein may be manufactured and/or assembled in accordance with the teachings of copending U.S. Provisional Patent Application Ser. No. 60/559,890, entitled "COMPOSITE BARREL SECTIONS FOR AIRCRAFT FUSELAGES AND OTHER STRUCTURES, AND METHODS AND SYSTEMS FOR MANUFACTURING SUCH BARREL SECTIONS," and/or copending U.S. patent application Ser. No. 10/819,084, entitled "STRUCTURAL PANELS FOR USE IN AIRCRAFT FUSELAGES AND OTHER STRUCTURES," both of which were filed on Apr. 6, 2004, and are incorporated herein in their entireties by reference.

Further, the subject matter of copending U.S. patent application Ser. Nos. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; Ser. No. 10/717,030, entitled "METHOD OF TRANSFERRING LARGE UNCURED COMPOSITE LAMINATES," filed Nov. 18, 2003; Ser. No. 10/646,392, entitled "AUTOMATED COMPOSITE LAY-UP TO AN INTERNAL FUSELAGE MANDREL," filed Aug. 22, 2003; Ser. No. 10/630,594, entitled "COMPOSITE FUSELAGE MACHINE," filed Jul. 28, 2003; Ser. No. 10/646,316, entitled "UNIDIRECTIONAL, MULTI-HEAD FIBER PLACEMENT," filed Aug. 22, 2003; Ser. No. 10/301,949, entitled "PARALLEL CONFIGURATION COMPOSITE MATERIAL FABRICATOR," filed Nov. 22, 2002; Ser. No. 10/799,306, entitled "SYSTEMS AND METHODS ENABLING AUTOMATED RETURN TO AND/OR REPAIR OF DEFECTS WITH A MATERIAL PLACEMENT MACHINE," filed Mar. 12, 2004; Ser. No. 10/726,099, entitled "SYSTEMS AND METHODS FOR DETERMINING DEFECT CHARACTERISTICS OF A COMPOSITE STRUCTURE," filed Dec. 2, 2003; Ser. No. 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003; and Ser. No. 10/822,538, entitled "SYSTEMS AND METHODS FOR USING LIGHT TO INDICATE DEFECT LOCATIONS ON A COMPOSITE STRUCTURE, filed Apr. 12, 2004, is incorporated herein in its entirety by reference. In addition, the subject matter of U.S. Pat. No. 6,168,358 is also incorporated herein in its entirety by reference.

From the foregoing, it will be appreciated that specific embodiments of the invention have been described herein for purposes of illustration, but that various modifications may be made without deviating from the spirit and scope of the invention. For example, although the various structural panels described above have been described in the context of aircraft structures, in other embodiments, such panels can be used in other applications, such as for land, water, and space vehicles. Accordingly, the invention is not limited, except as by the appended claims.

We claim:

1. A structural panel comprising:
a skin;
a first stiffener comprising composite material, the first stiffener having a first flange portion bonded to the skin and a first raised portion projecting away from the skin;
at least a second stiffener comprising composite material, the second stiffener spaced apart from the first stiffener, the second stiffener having a second flange portion bonded to the skin and a second raised portion projecting away from the skin, at least one of the first flange portion of the first stiffener and the second flange portion of the second stiffener extends toward the other to form a support surface extending between the first raised portion of the first stiffener and the second raised portion of the second stiffener, the first stiffener comprising a third flange portion and the second stiffener comprising a fourth flange portion, the third flange portion and the fourth flange portion bonded to the skin and separated from each other at a distance greater than a separation between the first flange portion and the second flange portion; and
a support member in contact with the support surface between the first raised portion of the first stiffener and the second raised portion of the second stiffener, the support member comprising a first frame section and a second frame section, the first frame section including a base portion and an upright portion extending away from the skin, the base portion contacting the support surface such that the base portion makes contact with the support surface with a substantial absence of joggles in the base portion, and the second frame section connected to the upright portion of the first frame section.

2. The structural panel of claim 1 wherein the support member includes at least first and second openings, and wherein the first raised portion of the first stiffener extends through the first opening and the second raised portion of the second stiffener extends through the second opening.

3. The structural panel of claim 1 wherein the support member includes at least first and second openings and a mating surface, wherein the first raised portion of the first stiffener extends through the first opening and the second raised portion of the second stiffener extends through the second opening, wherein the mating surface extends from the first opening to the second opening in the absence of a joggle, and wherein the mating surface contacts the support surface between the first raised portion of the first stiffener and the second raised portion of the second stiffener.

4. The structural panel of claim 1 wherein the first flange portion of the first stiffener has a first outer edge and the second flange portion of the second stiffener has a second outer edge facing the first outer edge, and wherein the first outer edge is spaced apart from the second outer edge by a distance of about 0.2 inch or less.

5. The structural panel of claim 1 wherein the first flange portion of the first stiffener has a first outer edge and the second flange portion of the second stiffener has a second outer edge facing the first outer edge, and wherein the first outer edge is spaced apart from the second outer edge by a distance of about 0.1 inch or less.

6. The structural panel of claim 1 wherein the support member is attached to the first and second stiffeners.

7. The structural panel of claim 1 wherein the second frame section comprises a substantially C-shaped cross section.

8. The structural panel of claim 1 wherein the second frame section is fastened to the first frame section with a plurality of fasteners.

9. The structural panel of claim 1 wherein the second frame section is adhesively bonded to the first frame section.

10. The structural panel of claim 1 wherein the second frame section is connected to the first frame section after the first frame section has been connected to the support member so as to allow adjustment of the second frame section relative to the first frame section.

11. The structural panel of claim 1 wherein the first frame section is adhesively bonded to the support member without contacting the skin.

12. The structural panel of claim 1 wherein the stiffener comprises a hat shaped cross section.

13. A system for carrying structural loads, the system comprising:
skin means for carrying shear loads;
first stiffener means for carrying a first portion of axial loads;
at least second stiffener means spaced apart from the first stiffener means for carrying a second portion of the axial loads;
a first flange portion and a second flange portion extending from each of the first stiffener means and the second stiffener means for mating the first and second stiffener means to the skin means, the second flange portion of the first stiffener means positioned adjacent to the first flange portion of the second stiffener means and defining a support surface, the first stiffener comprising a third flange portion and the second stiffener comprising a fourth flange portion, the third flange portion and the fourth flange portion bonded to the skin and separated from each other at a distance greater than a separation between the first flange portion and the second flange portion; and
a frame for carrying bending loads, the frame comprising a first frame section and a section frame section, the first frame section including a base portion and an upright portion extending away from the skin means, the base portion contacting the support surface such that the base portion makes contact with the support surface with a substantial absence of joggles in the base portion, and the second frame section connected to the upright portion of the first frame section.

14. The system of claim 13, further comprising means for allowing the first and second stiffener means to extend at least partially through the frame.

15. The system of claim 13 wherein the first frame section is adhesively bonded to the support surface without contacting the skin means so as to sandwich portions of the first and second stiffener means between the frame and the skin means.

16. The system of claim 13 wherein the first and second stiffener means are adhesively bonded to the skin means.

17. An apparatus comprising:
a composite skin;
a set of composite stiffeners, at least a first stiffener and a second stiffener in the set of stiffeners comprising a raised portion and a first flange and a second flange extending from the raised portion, the first flange and the second flange contacting the skin, and wherein a first flange from the first stiffener is positioned proximate a second flange from a second stiffener such that an edge of the first flange and an edge of the second flange are separated by a set distance, the first flange and the second flange defining a support surface, the first stiffener comprising a third flange portion and the second stiffener comprising a fourth flange portion, the third flange portion and the fourth flange portion bonded to the skin and separated from each other at a distance greater than a separation between the first flange portion and the second flange portion; and
a set of composite support members attached to the support surface, at least one composite support member in the set of composite support members comprising a first frame section and a section frame section, the first frame section including a base portion and an upright portion extending away from the skin, the base portion attached to the support surface such that the base portion makes contact with the support surface with a substantial absence of joggles in the base portion, and the second frame section connected to the upright portion of the first frame section, and the base portion comprising a set of mouse holes to accommodate the set of composite stiffeners.

18. The apparatus of claim 17 wherein the second frame section comprises a substantially C-shaped cross section.

19. The apparatus of claim 17 wherein the second frame section is adhesively bonded to the first frame section.

20. The apparatus of claim 17 wherein the second frame section is connected to the first frame section after the first frame section has been connected to the support member so as to allow adjustment of the second frame section relative to the first frame section.

21. The apparatus of claim 17 wherein the first frame section is adhesively bonded to the support member without contacting the skin.

* * * * *